US009101859B2

(12) United States Patent
Jons et al.

(10) Patent No.: US 9,101,859 B2
(45) Date of Patent: Aug. 11, 2015

(54) CROSS-FLOW FILTRATION SYSTEM INCLUDING PARTICULATE SETTLING ZONE

(71) Applicant: Dow Global Technologies LLC, Midland, MI (US)

(72) Inventors: Steven D. Jons, Eden Prairie, MN (US); John H. Mallard, Saratoga, CA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/391,128

(22) PCT Filed: May 22, 2013

(86) PCT No.: PCT/US2013/042130
§ 371 (c)(1),
(2) Date: Oct. 7, 2014

(87) PCT Pub. No.: WO2013/181029
PCT Pub. Date: Dec. 5, 2013

(65) Prior Publication Data
US 2015/0083651 A1    Mar. 26, 2015

Related U.S. Application Data

(60) Provisional application No. 61/655,654, filed on Jun. 5, 2012, provisional application No. 61/654,418, filed on Jun. 1, 2012.

(51) Int. Cl.
*B01D 29/90* (2006.01)
*B01D 29/64* (2006.01)
(Continued)

(52) U.S. Cl.
CPC .......... *B01D 29/908* (2013.01); *B01D 21/0006* (2013.01); *B01D 21/0012* (2013.01);
(Continued)

(58) Field of Classification Search
CPC ........... B01D 21/0006; B01D 21/0012; B01D 21/0018; B01D 21/0036; B01D 21/0042; B01D 21/2488; B01D 21/267; B01D 21/34; B01D 29/33; B01D 29/6407; B01D 29/6415; B01D 29/6476; B01D 29/908; B04C 2009/004; B04C 5/04; B04C 5/081; B04C 5/22; B04C 9/00; B04C 5/103; B04C 5/14
See application file for complete search history.

(56) References Cited

U.S. PATENT DOCUMENTS

| 431,448 A | 7/1890 | Dixon |
|---|---|---|
| 1,107,485 A | 8/1914 | Bowser |

(Continued)

FOREIGN PATENT DOCUMENTS

| EP | 0375671 | 6/1990 |
|---|---|---|
| EP | 0475252 | 3/1992 |

(Continued)

OTHER PUBLICATIONS

DOW Water & Process Solutions, G. Onifer, Oct. 2010, Executive Summary: Clean Filtration Technologies, Inc Turboclone Filter.
(Continued)

*Primary Examiner* — John Kim
(74) *Attorney, Agent, or Firm* — Edward W. Black

(57) ABSTRACT

Cross-flow filtration systems and corresponding methods for separation particulate matter from liquids. A representative system includes a cross-flow filtration zone (24) in fluid communication with a particulate settling zone (30) and further includes a fluid inlet (14) in fluid communication with one of the zones and a process fluid outlet (20) and in fluid communication with the other zone. A fluid treatment pathway (28) extends from the fluid inlet (14), through the cross-flow filtration and particulate settling zones (24, 30) to the process fluid outlet (20). A filter assembly (26) is located within the cross-flow filtration zone (24) and comprises a membrane surface (44) that isolates a filtrate chamber (46) from the fluid treatment pathway (28), and the filtrate chamber (46) is in fluid communication with a filtered fluid outlet (16). A recirculation pump (Z) in fluid communication with the process fluid outlet (20) and fluid inlet (14). A pressurizable recirculation loop (A) comprises the fluid treatment pathway (28) and recirculation pump (Z) and the recirculation pump (Z) is adapted for driving pressurized through the recirculation loop (A). A feed pump (Y) is adapted to introduce feed liquid into the system (10); and an effluent outlet (18) in fluid communication with the particulate settling zone (30). The feed pump (Y), effluent outlet (18) and filtered fluid outlet (16) reside outside of the recirculation loop (A).

10 Claims, 12 Drawing Sheets

(51) Int. Cl.

| | |
|---|---|
| *B01D 21/26* | (2006.01) |
| *B01D 21/00* | (2006.01) |
| *B01D 21/24* | (2006.01) |
| *B01D 21/34* | (2006.01) |
| *B01D 29/33* | (2006.01) |
| *B04C 5/04* | (2006.01) |
| *B04C 5/081* | (2006.01) |
| *B04C 5/103* | (2006.01) |
| *B04C 5/14* | (2006.01) |
| *B04C 5/22* | (2006.01) |
| *B04C 9/00* | (2006.01) |

(52) U.S. Cl.
CPC ........ *B01D21/0018* (2013.01); *B01D 21/0036* (2013.01); *B01D 21/2488* (2013.01); *B01D 21/267* (2013.01); *B01D 21/34* (2013.01); *B01D 29/33* (2013.01); *B01D 29/6407* (2013.01); *B01D 29/6415* (2013.01); *B01D 29/6476* (2013.01); *B04C 5/04* (2013.01); *B04C 5/081* (2013.01); *B04C 5/103* (2013.01); *B04C 5/14* (2013.01); *B04C 5/22* (2013.01); *B04C 9/00* (2013.01); *B01D 21/0042* (2013.01); *B04C 2009/004* (2013.01)

(56) References Cited

U.S. PATENT DOCUMENTS

| | | | |
|---|---|---|---|
| 1,919,653 A | 7/1933 | Hill | |
| 2,706,045 A | 4/1955 | Large | |
| 2,788,087 A | 4/1957 | Lenehan | |
| 2,917,173 A | 12/1959 | Rakowsky | |
| 3,061,098 A | 10/1962 | Brezinski | |
| 3,219,186 A | 11/1965 | Polhemus et al. | |
| 3,285,422 A | 11/1966 | Wiley | |
| 3,529,544 A | 9/1970 | Inoue | |
| 3,529,724 A | 9/1970 | Maciula et al. | |
| 3,822,533 A | 7/1974 | Oranje | |
| 3,893,914 A | 7/1975 | Bobo | |
| 3,947,364 A | 3/1976 | Laval, Jr. | |
| 4,062,766 A | 12/1977 | Duesling | |
| 4,120,783 A | 10/1978 | Baummer | |
| 4,146,468 A | 3/1979 | Wilson | |
| 4,159,073 A | 6/1979 | Liller | |
| 4,178,258 A | 12/1979 | Papay et al. | |
| 4,216,095 A | 8/1980 | Ruff | |
| 4,298,465 A | 11/1981 | Druffel | |
| 4,414,112 A | 11/1983 | Simpson et al. | |
| 4,575,406 A | 3/1986 | Slafer | |
| 4,596,586 A | 6/1986 | Davies et al. | |
| 4,608,169 A | 8/1986 | Arvanitakis | |
| 4,651,540 A | 3/1987 | Morse | |
| 4,662,909 A | 5/1987 | Durr | |
| 4,698,156 A | 10/1987 | Bumpers | |
| 4,865,751 A | 9/1989 | Smisson | |
| 4,931,180 A | 6/1990 | Darchambeau | |
| 5,104,520 A | 4/1992 | Maronde et al. | |
| 5,116,516 A | 5/1992 | Smisson | |
| 5,188,238 A | 2/1993 | Smisson et al. | |
| 5,227,061 A | 7/1993 | Bedsole | |
| 5,277,705 A | 1/1994 | Anderson et al. | |
| 5,407,584 A | 4/1995 | Broussard, Sr. | |
| 5,466,384 A | 11/1995 | Prevost et al. | |
| 5,478,484 A | 12/1995 | Michaluk | |
| 5,593,043 A | 1/1997 | Ozmerih | |
| 5,879,545 A | 3/1999 | Antoun | |
| 5,972,215 A | 10/1999 | Kammel | |
| 6,110,242 A | 8/2000 | Young | |
| 6,117,340 A | 9/2000 | Carstens | |
| 6,210,457 B1 | 4/2001 | Siemers | |
| 6,238,579 B1 | 5/2001 | Paxton et al. | |
| 6,251,296 B1 | 6/2001 | Conrad et al. | |
| 6,511,599 B2 | 1/2003 | Jaroszczyk et al. | |
| 6,531,066 B1 | 3/2003 | Saunders et al. | |
| 6,613,231 B1 | 9/2003 | Jitariouk | |
| 6,790,346 B2 | 9/2004 | Caleffi | |
| 6,896,720 B1 | 5/2005 | Arnold et al. | |
| 7,166,230 B2 | 1/2007 | Nilsen et al. | |
| 7,316,067 B2 | 1/2008 | Blakey | |
| 7,351,269 B2 | 4/2008 | Yau | |
| 7,632,416 B2 | 12/2009 | Levitt | |
| 7,651,000 B2 | 1/2010 | Knol | |
| 7,785,479 B1 | 8/2010 | Hosford | |
| 7,854,779 B2 | 12/2010 | Oh | |
| 7,896,169 B2 | 3/2011 | Levitt et al. | |
| 7,998,251 B2 | 8/2011 | Pondelick et al. | |
| 8,201,697 B2 | 6/2012 | Levitt et al. | |
| 8,663,472 B1 | 3/2014 | Mallard et al. | |
| 8,701,896 B2 | 4/2014 | Levitt et al. | |
| 2003/0029790 A1 | 2/2003 | Templeton | |
| 2003/0221996 A1 | 12/2003 | Svoronos et al. | |
| 2004/0211734 A1 | 10/2004 | Moya | |
| 2005/0109684 A1 | 5/2005 | DiBella et al. | |
| 2007/0039900 A1 | 2/2007 | Levitt | |
| 2007/0075001 A1 | 4/2007 | Knol | |
| 2007/0187328 A1 | 8/2007 | Gordon | |
| 2010/0044309 A1 | 2/2010 | Lee | |
| 2010/0083832 A1 | 4/2010 | Pondelick et al. | |
| 2010/0096310 A1 | 4/2010 | Yoshida | |
| 2011/0120959 A1 | 5/2011 | Levitt et al. | |
| 2011/0160087 A1 | 6/2011 | Zhao et al. | |
| 2011/0220586 A1 | 9/2011 | Levitt | |
| 2012/0010063 A1 | 1/2012 | Levitt et al. | |
| 2012/0145609 A1 | 6/2012 | Caffell et al. | |
| 2013/0126421 A1 | 5/2013 | Levitt et al. | |

FOREIGN PATENT DOCUMENTS

| | | |
|---|---|---|
| EP | 0380817 | 1/1993 |
| EP | 0566792 | 10/1993 |
| EP | 2082793 | 7/2009 |
| GB | 2007118 | 5/1979 |
| GB | 2309182 | 7/1997 |
| GB | 2423264 | 8/2006 |
| WO | 0218056 | 3/2002 |
| WO | 03026832 | 4/2003 |
| WO | 2004064978 | 8/2004 |
| WO | 2011160087 | 12/2011 |
| WO | 2012154448 | 11/2012 |
| WO | 2013181028 | 12/2013 |
| WO | 2013181029 | 12/2013 |

OTHER PUBLICATIONS

Clean Filtration Technologies, Inc. CFT Turboclone Demo System, 2010.
Clean Filtration Technologies, Inc. CFT Turboclone TC-201 Technical Datasheet, 2010.

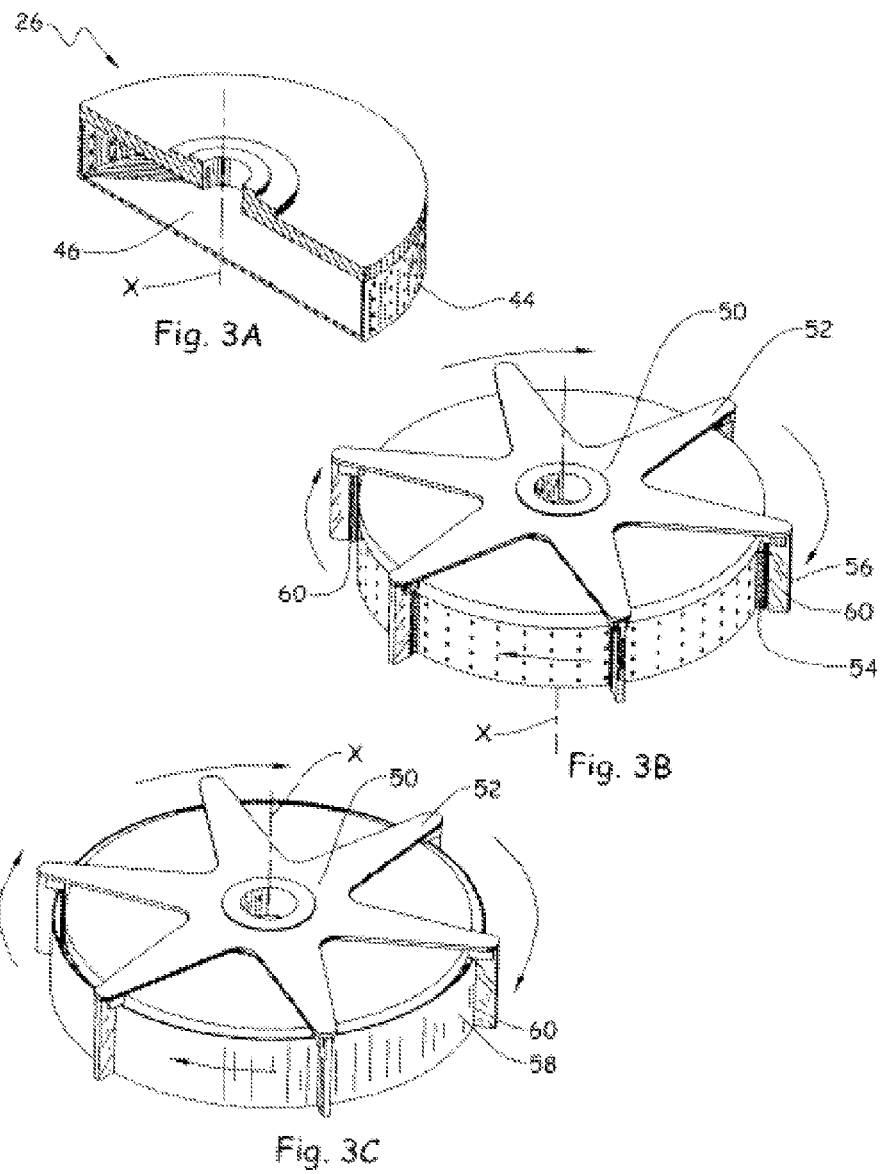

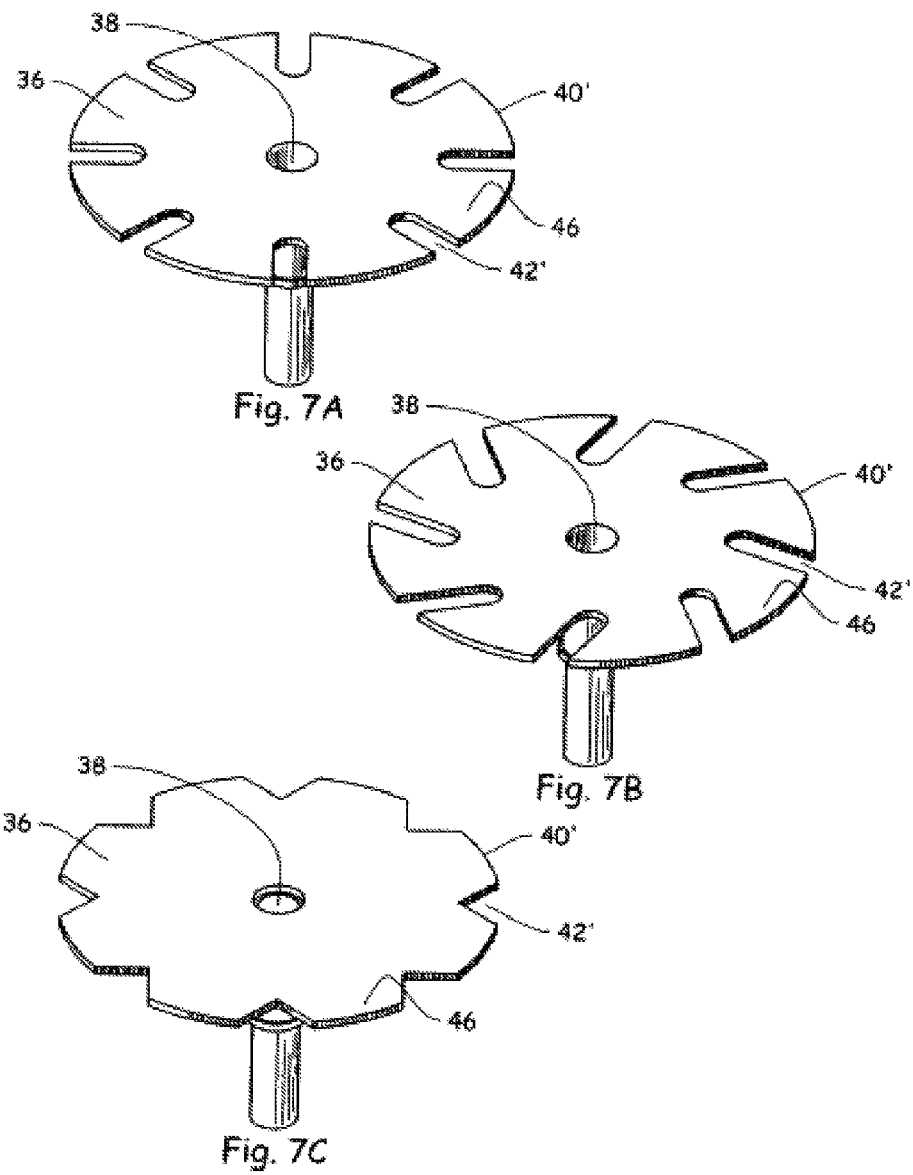

US 9,101,859 B2

CROSS-FLOW FILTRATION SYSTEM INCLUDING PARTICULATE SETTLING ZONE

TECHNICAL FIELD

The invention is generally directed to cross-flow filtration assemblies for separating particulate matter from liquids.

BACKGROUND

Various techniques have been utilized to separate suspended particles from liquids including coagulation, flocculation, sedimentation, filtration and cyclonic separation. For example, in a typical hydroclone embodiment, pressurized feed liquid is introduced into a conically shaped chamber under conditions that create a vortex within the chamber. Feed liquid is introduced near the top of a conical chamber and an effluent stream is discharged near the bottom. Centrifugal forces associated with the vortex urge denser particles towards the periphery of the chamber. As a result, liquid located near the center of the vortex has a lower concentration of particles than that at the periphery. This "cleaner" liquid can then be withdrawn from a central region of the hydroclone. Examples of hydroclones are described in: U.S. Pat. Nos. 3,061,098, 3,529,544, 4,414,112, 5,104,520, 5,407,584 and 5,478,484. Separation efficiency can be improved by including a filter within the chamber such that a portion of the liquid moving to the center of the chamber passes through the filter. In such embodiments, cyclonic separation is combined with cross-flow filtration. Examples of such embodiments are described in: U.S. Pat. Nos. 7,632,416, 7,896,169, US2011/0120959 and US2012/0010063.

Size and separation efficiency are limiting factors for any given separation system. For example, while flocculation and sedimentation techniques are relatively energy efficient, they typically require settling ponds and long separation times. Hydroclones offer a smaller footprint, but have higher energy demand and are less effective at removing small particulate matter. Cross-flow filtration systems are small and produce high quality separations but are prone to fouling and are energy intensive. New systems are sought which offer an improved balance of attributes including overall size and separation efficiency.

SUMMARY

The invention includes a cross-flow filtration system and corresponding methods for separating particulate matter from liquids. A representative system includes a cross-flow filtration zone in fluid communication with a particulate settling zone. The system further includes: a fluid inlet (14) in fluid communication with one of the zones and a process fluid outlet (20) in fluid communication with the other zone. A fluid treatment pathway (28) extends from the fluid inlet (14), through the cross-flow filtration and particulate settling zones (24, 30) to the process fluid outlet (20). A filter assembly (26) is located within the cross-flow filtration zone (24) and comprises a membrane surface (44) that isolates a filtrate chamber (46) from the fluid treatment pathway (28), and the filtrate chamber (46) is in fluid communication with a filtered fluid outlet (16). A recirculation pump (Z) is in fluid communication with the process fluid outlet (20) and the fluid inlet (14). A pressurizable recirculation loop (A) comprises the fluid treatment pathway (28) and recirculation pump (Z), and the recirculation pump (Z) is adapted for driving pressurized through the recirculation loop (A). A feed pump (Y) is adapted to introduce feed liquid into the system (10); and an effluent outlet (18) is in fluid communication with the particulate settling zone (30). The feed pump (Y), effluent outlet (18), and filtered fluid outlet (16) reside outside of the recirculation loop (A).

The invention finds particular utility in the treatment of: pulp effluent generating by paper mills, process water generated by oil and gas recovery, and municipal and industrial waste water.

BRIEF DESCRIPTION OF THE DRAWINGS

Various aspects of the invention may be better understood by reference to the following description taken in conjunction with the accompanying drawings wherein like numerals have been used throughout the various views to designate like parts. The depictions are illustrative and are not intended to be to scale or otherwise limit the invention.

FIG. 3A is a partially cut-away perspective view of a representative filter assembly.

FIG. 3B is a perspective view of the filter of FIG. 3A including a cleaning assembly.

FIG. 3C is a perspective view of the assembly of FIG. 3B including an inlet flow shield.

FIGS. 7A, B and C are perspective views of various embodiments of effluent bathers.

DETAILED DESCRIPTION

The present invention includes cross-flow filtration systems for separating particulate matter from liquids and methods for using such systems. The term "system" refers to an interconnected assembly of components. In one embodiment, the invention combines cross-flow filtration and particle settling within a pressurized recirculation loop. Particle settling may include floatation or sedimentation based on particle density differences with water. In a preferred embodiment, the system further incorporates cyclonic separation.

Figure 1A:
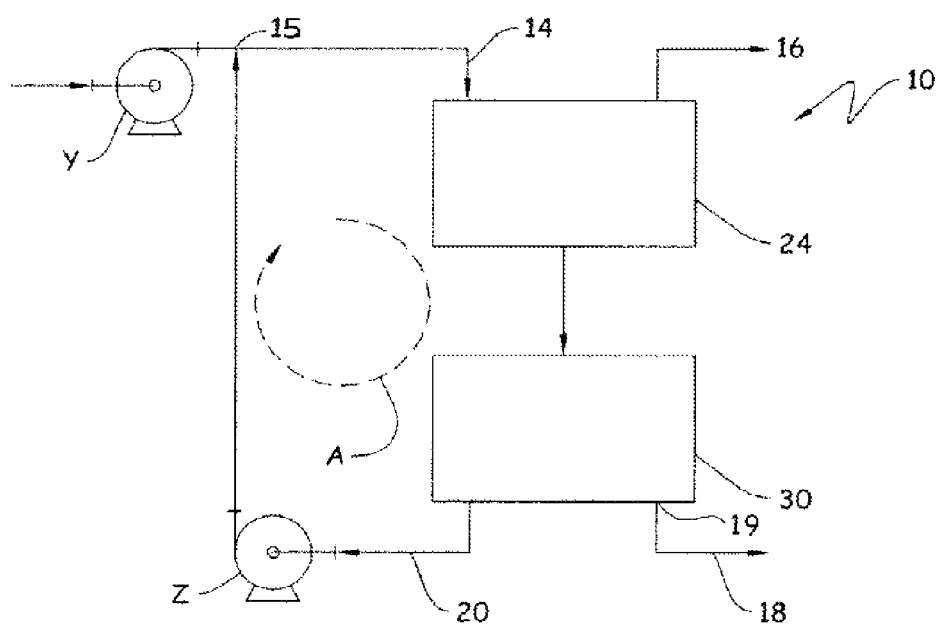
FIGS. 1A-F are schematic views of alternative embodiments of the invention.
Figure 1B:
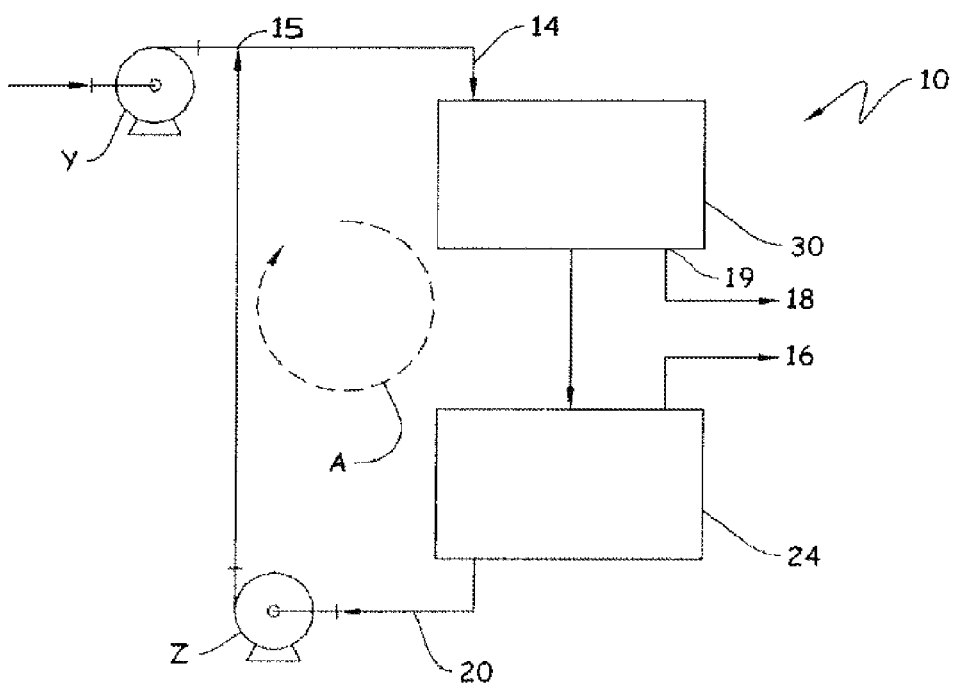
Figure 1C:
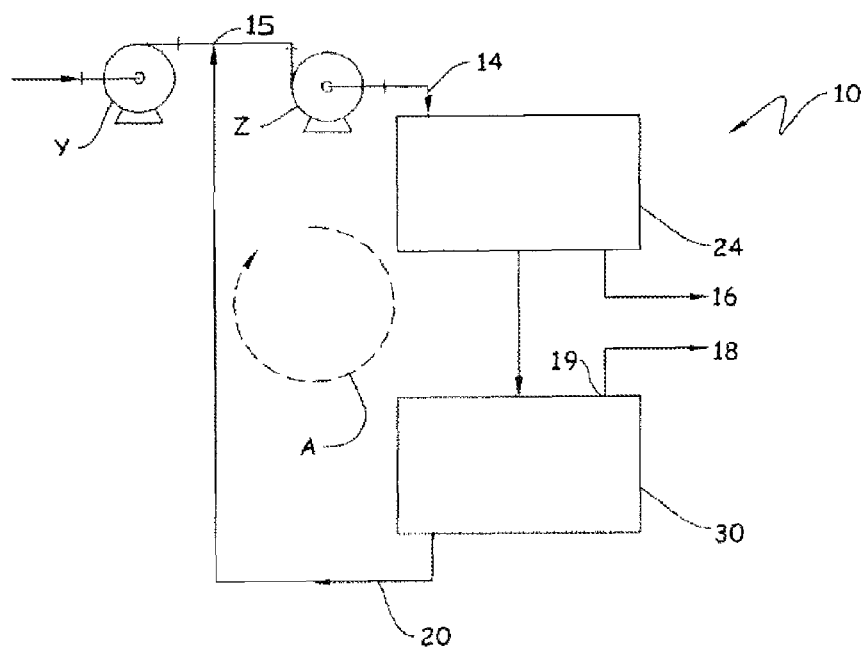
Figure 1D:
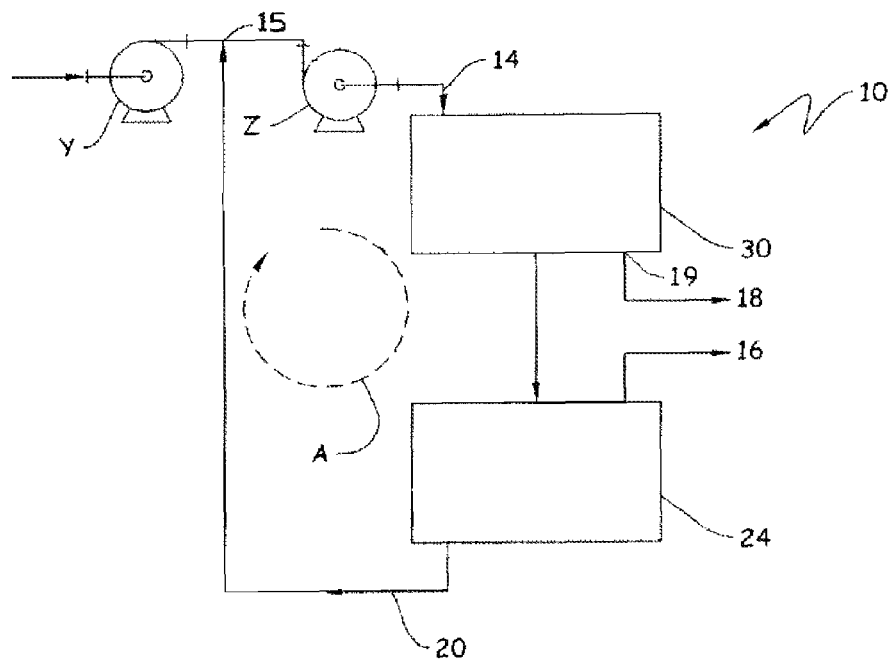
Figure 1E:
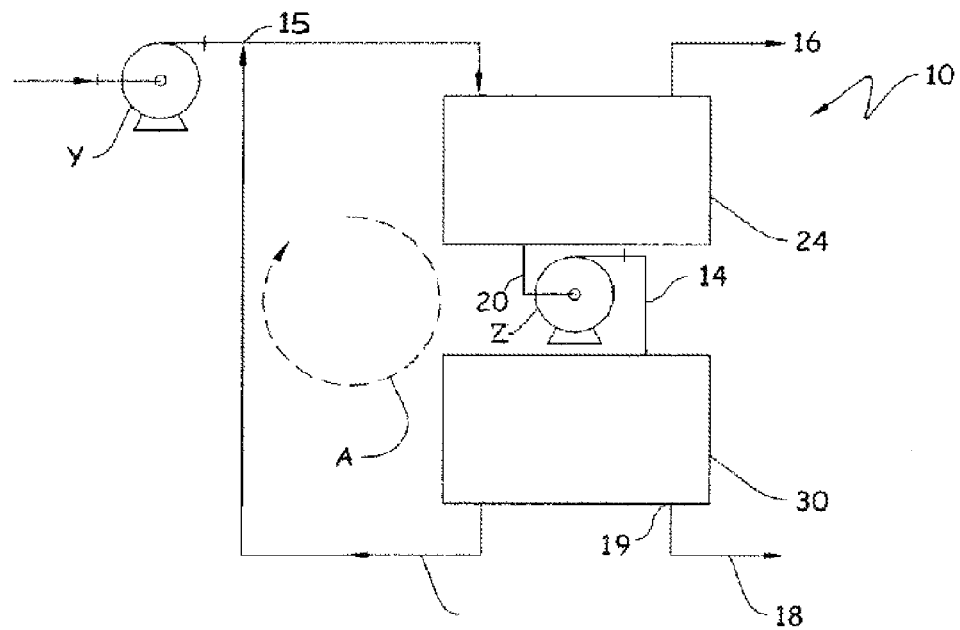
Figure 1F:
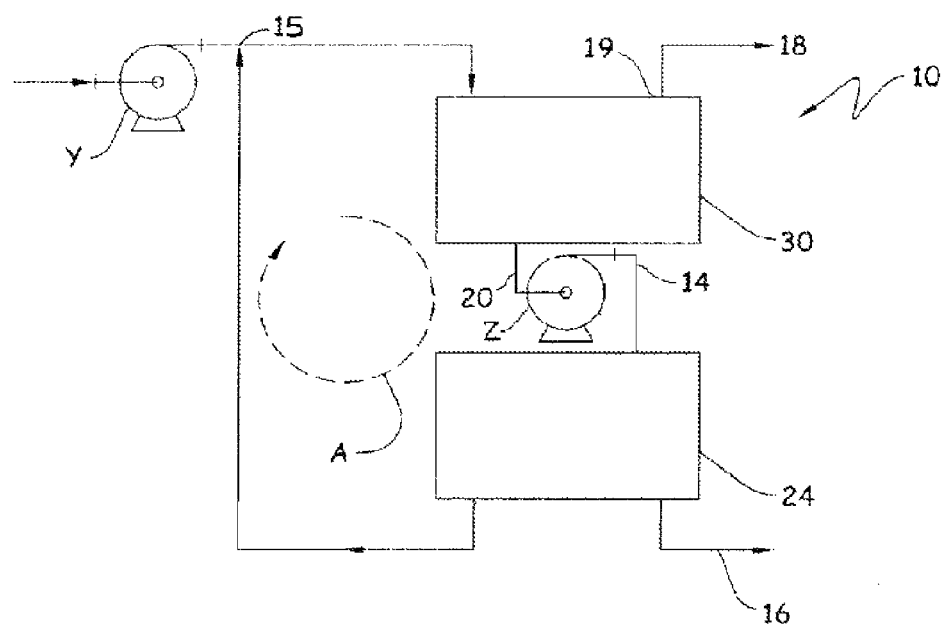

Representative system (10) are schematically illustrated in FIGS. 1A-F including a pressurizable cross-flow filtration zone (24) in fluid communication with a particulate settling zone (30). As implied by the name, cross-flow filtration occurs in the cross-flow filtration zone (24), e.g. by way of passing feed fluid across a membrane surface. Similarly, particle settling occurs in the particulate settling zone (30). The zones (24, 30) are sequentially aligned along a fluid treatment pathway. In preferred embodiments, the particulate settling zone (30) is located downstream from the cross-flow filtration zone (24), as shown in FIGS. 1A, C and F, (where "downstream" is defined by a zone operating at relatively lower pressure than the other). Alternatively, the cross-flow filtration zone (24) may be located downstream from the particulate settling zone (30) as shown in FIGS. 1B, D and E. While shown as including two zones, additional separation zones may be included. The zones (24, 30) may reside in separate pressurizable modules or vessels, or be housed within a common pressurizable tank. In one embodiment described in connection with FIG. 2, both zones (24, 30) reside within a common tank (12).

The system (10) further includes: a fluid inlet (14) in fluid communication with one of the zones (e.g. cross-flow filtration zone (24) in FIG. 1A and particulate settling zone (30) in FIG. 1B), and a process fluid outlet (20) in fluid communication with the other zone. An effluent outlet (18) is also in fluid communication with the particulate settling zone (30). A fluid treatment pathway extends from the fluid inlet (14), through the cross-flow filtration zone (30) and particulate settling zone (30) to the process fluid outlet (20). While not shown, the system (10) may include additional inlets and outlets.

The system includes a recirculation pump (Z) in fluid communication with the process fluid outlet (20) and fluid inlet (14). The recirculation pump (Z) along with the process fluid outlet (20), fluid inlet (14) and fluid treatment pathway (28) collectively define a pressurizable recirculation loop (A).

The system (10) also includes a feed pump (Y) adapted for introducing a pressurized liquid mixture (feed) to be treated into the recirculation loop (A). FIGS. 1A and 1B show introducing a feed liquid mixture into the fluid inlet (14) through an adjacent junction point (15). FIGS. 1C through 1F show alternative designs where the recirculation pump (Z) is located at various positions within the loop (A) relative to the feed pump (Y), the cross-flow filtration zone (24), and particulate settling zone (30). While not shown, the system (10) may include additional pumps and corresponding valves for facilitating movement of liquids and solids. While in fluid communication with the recirculation loop (A), the feed pump (Y), effluent outlet (18) and filtered fluid outlet (16) reside outside of the recirculation loop (A) and only serve as one-way inlets and outlet with the loop (A). In a preferred embodiment, the recirculation pump (Z) is adapted to drive at least twice the volume of liquid through the recirculation loop (A) as introduced by the feed pump (Y). In another embodiment, the feed pump (Y) is adapted to provide a greater pressure increase than provided by the recirculation pump (Z).

The particulate settling zone (30) is adapted to facilitate the separation of solids from liquid as a feed mixture flows through the zone. In a preferred embodiment, solids are separated from liquid by gravitational and frictional drag forces occurring as fluid flows through the zone (30). Large and dense particulate matter settles out of the fluid flow and may exit the particulate settling zone (30) by way of the effluent outlet (18) while the remaining liquid mixture either exits as process fluid by way of the process fluid outlet (20) as illustrated in FIG. 1A, or flows downstream to the cross-flow filtration zone (24) as illustrated in FIG. 1B. In an alternative embodiment, less dense particulates may accumulate for removal in a raised region of the particulate settling zone (30), and both sedimentation and floatation separation methods may be used together.

As will be described with reference to FIGS. 2-5, a filter assembly is located within the cross-flow filtration zone (24) and includes a membrane surface adjacent the fluid treatment pathway that isolates the fluid treatment pathway from a filtrate chamber. The filtrate chamber is in fluid communication with a filtered fluid outlet (16). In operation, feed liquid enters the cross-flow filtration zone (24) and flows across (i.e. "cross-flow") the membrane surface. A portion of feed passes through the membrane and enters the filtrate chamber as "filtrate," which may then exit the system (10) by way of the filtered fluid outlet (16).

Figure 2:
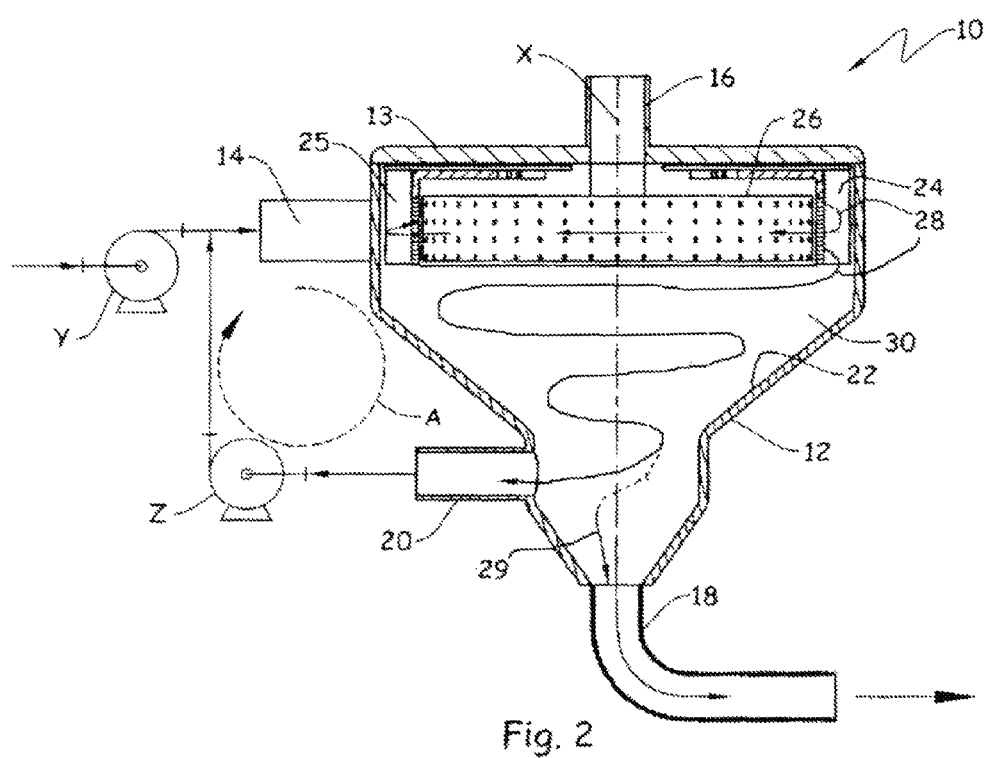
FIG. 2 is a cross-sectional view showing one embodiment of the invention.

FIG. 2 illustrates an embodiment of the invention wherein the cross-flow filtration zone (24) and particulate settling zone (30) are both housed within a common tank (12), and the membrane surface encloses the filtrate chamber. While not required, the illustrated tank (12) is adapted to operate as a hydroclone. For purposes of the present description, the term "hydroclone" refers to a filtration device that at least partially relies upon centrifugal forces generated by vortex fluid flow to separate constituents from a fluid mixture. As illustrated, the system (10) includes a tank (12) having a removable lid (13), a fluid inlet (14), a filtered fluid outlet (16), an effluent outlet (18), a process fluid outlet (20) and an inner peripheral wall (22) enclosing a chamber centered about an axis (X). While depicted as including a single chamber, additional chambers may also be included as described in connection with FIGS. 4-5. Similarly, additional fluid inlets and outlets may also be included. While shown as having a cylindrical upper section and a frusto-conical base, the tank (12) may have other configurations including a cylindrical shape.

A filter assembly (26) is preferably centrally located within the chamber and is evenly spaced from the inner peripheral wall (22) of the tank (12). As best shown in FIG. 3A, the assembly (26) may include a cylindrical outer membrane surface (44) symmetrically located about the axis (X) and enclosing a filtrate chamber (46) that is in fluid communication with the filtered fluid outlet (16). While shown as being shaped as a simple cylinder, other configurations may be used including stepped and conical shaped filters. The membrane surface (44) may be fabricated from a wide variety of materials including porous polymers, ceramics and metals. In one embodiment, the membrane is relatively thin, e.g. from 0.2-0.4 mm and is supported by an underlying rigid frame or porous support (not shown). A representative example is described in US2012/0010063. The pore size (e.g. 1 to 500 micron), shape (e.g. V-shape, cylindrical, slotted) and uniformity of the membrane surface (44) may vary depending upon application. In many preferred embodiments, the membrane surface (44) comprises a corrosion-resistant metal (e.g. electroformed nickel screen) including uniform sized pores having sizes from 5 to 200 microns, or even 10 to 100 microns. Representative examples of such materials are described: U.S. Pat. Nos. 7,632,416, 7,896,169, US2011/0120959, US 2011/0220586 and US2012/0010063, the entire subject matter of which is incorporated herein by reference. For purposes of this description, the pore size is defined by the minimum distance across the pore, so that it restricts passage of materials larger than this dimension.

Returning to FIG. 2, a fluid treatment pathway (28) extends from the fluid inlet (14) and defines a vortex region (25) between the inner peripheral wall (22) of the chamber and the membrane surface (44). In operation, pressurized feed fluid (e.g. preferably from 4 to 120 psi) enters the tank (12) via the fluid inlet (14) and follows along the fluid treatment pathway (28) which generates a vortex about the filter assembly (26). Centrifugal forces urge denser materials toward the inner peripheral wall (22) of the tank (12) while less dense liquid flows radially inward toward the filter assembly (26). A portion of this liquid flows through the membrane surface (44) into a filtrate chamber (46) and may subsequently exit the tank (12) as "filtrate" by way of the filtered fluid outlet (16). The remaining "non-filtrate" flows downward from the cross-flow filtration zone (24) to the particulate settling zone (30). Fluid flow slows and denser materials (e.g. particles) preferentially settle toward the lower center of the tank (12) and may then exit the tank by way of effluent outlet (18). The remaining liquid (hereinafter referred to as "process fluid") flows downward and may exit the tank (12) via process fluid outlet (20). As illustrated by the dashed circle (A) representing a recirculation loop, process fluid may be recycled back to the fluid inlet (14) for further treatment.

The system (10) may further include a cleaning assembly (50) for removing debris from the membrane surface (44) of the filter assembly (26). A representative embodiment is illustrated in FIG. 3B wherein the assembly (50) is concentrically located and rotatably engaged about the membrane surface (44) and includes one or more spokes (52) extending radially outward. A brush (54) extends downward from the end of the spoke (52) and engages (e.g. touches or comes very near to) the membrane surface (44). While shown as a brush (54), alternative cleaning means may be included including wipers, squeegees or scrappers. From 2 to 50 brushes, and preferably from 18 to 24 brushes are used in most embodiments. As represented by curved arrows, the cleaning assembly (50) rotates about filter assembly (26) such that the brush (54) sweeps the surface of the membrane substrate (54) and removes debris, e.g. by creating turbulence near the surface or by directly contacting the surface. One or more paddles (56) may be mounted at the end of at least one spoke (52) such that fluid flowing into the cross-flow filtration chamber (24) rotates the cleaning assembly (50) about the filter assembly (26). Spacing paddles (56) evenly about the filter assembly adds stability to the rotating movement of the cleaning assembly (50) and may help maintain vortex fluid flow in the cross-flow filtration chamber (24). While shown as extending radially outward from the membrane surface (44), the paddles may be slanted, (e.g. from −5° to −30° or 5° to 30° from the radial axis) to increase rotational velocity. Bearings may be used between the filter and cleaning assemblies (26, 50) to further facilitate rotation without impeding vortex fluid flow. In alternative embodiments not shown, the cleaning assembly (50) may be driven by alternative means, e.g. electronic motor, magnetic force, etc. In yet another embodiment, the filter assembly may move relative to a fixed cleaning assembly. In another yet embodiment not shown, the cleaning assembly may be concentrically located within and rotationally engaged with a surrounding membrane surface (44). In this case, the membrane surface (44) may also surround the fluid treatment pathway (28) and itself be located within the filtrate chamber (46).

The feed fluid inlet pressure and spacing between the outer periphery of the filter assembly (26) and the inner peripheral wall (22) of the tank (12) can be adapted to create and maintain a vortex fluid flow within the chamber (24). In order to further facilitate the creation and maintenance of vortex fluid flow, the fluid inlet (14) preferably directs incoming feed fluid on a tangential path about the vortex chamber, as indicated in FIG. 2. Even following such a tangential path, pressurized feed fluid may directly impinge upon the membrane surface (44) of the filtration assembly (26) and lead to premature wear or fouling—particularly in connection with feed fluids having high solids content. To protect the membrane surface (44), an inlet flow shield (58) may be located between the fluid inlet (14) and the membrane surface (44), e.g. concentrically located about the filter assembly (26). A representative example is illustrated in FIG. 3C. As shown, the shield (58) preferably comprises a non-porous cylindrical band of material, e.g. plastic, which blocks at least a portion of fluid flowing into the chamber (24) from the fluid inlet (14) from directly impinging upon (impacting) the membrane surface (44). The band may be formed from a continuous loop of material or by way of independent arcs. In a preferred embodiment, the shield (58) has a height approximating the height of the membrane surface (44) such that the shield (58) and membrane surface (44) forms concentric cylinders. In a preferred embodiment, the shield may be removably mounted to the cleaning assembly (50). By way of a non-limiting example, the paddles (56) of the cleaning assembly (50) may include vertical slots (60) for receiving the shield (58).

Figure 4A:
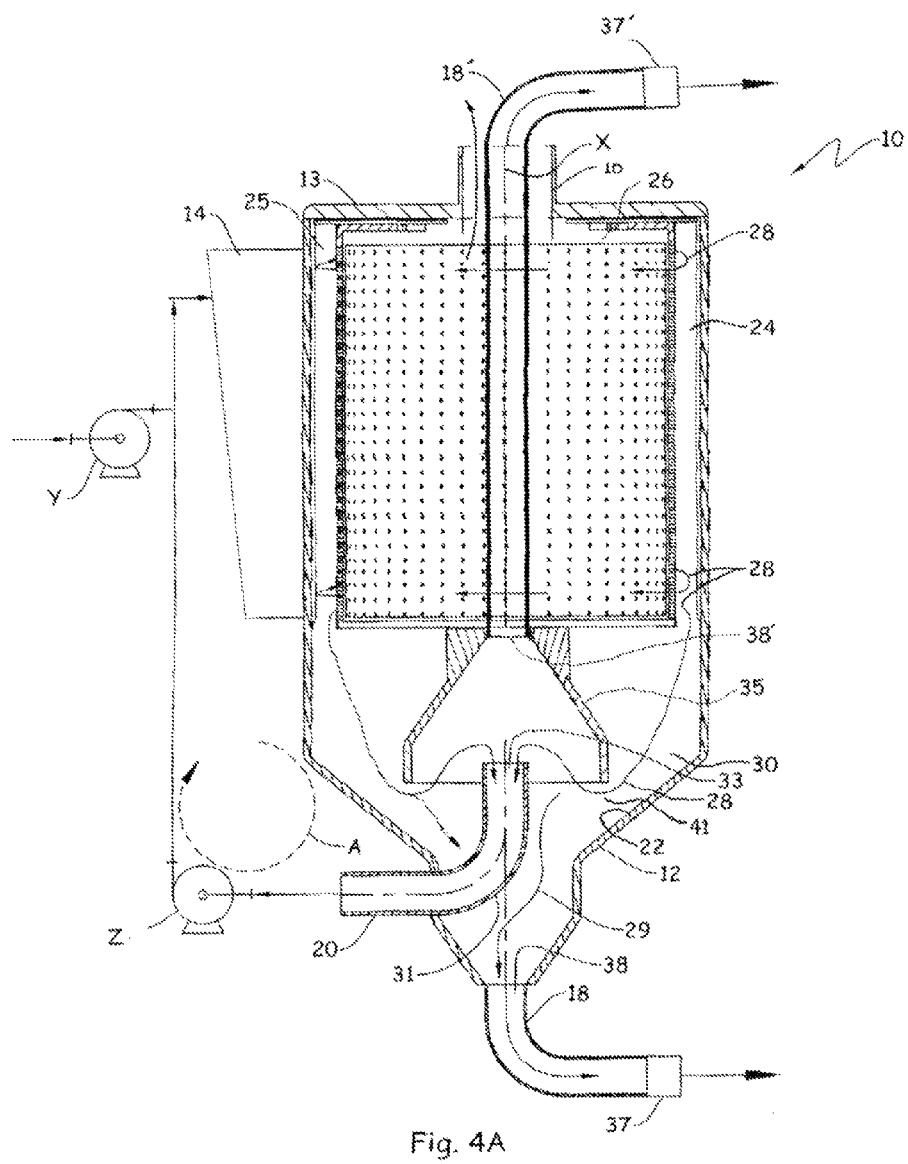
FIGS. 4A and B are cross-sectional views showing additional embodiments of the invention.
Figure 4B:
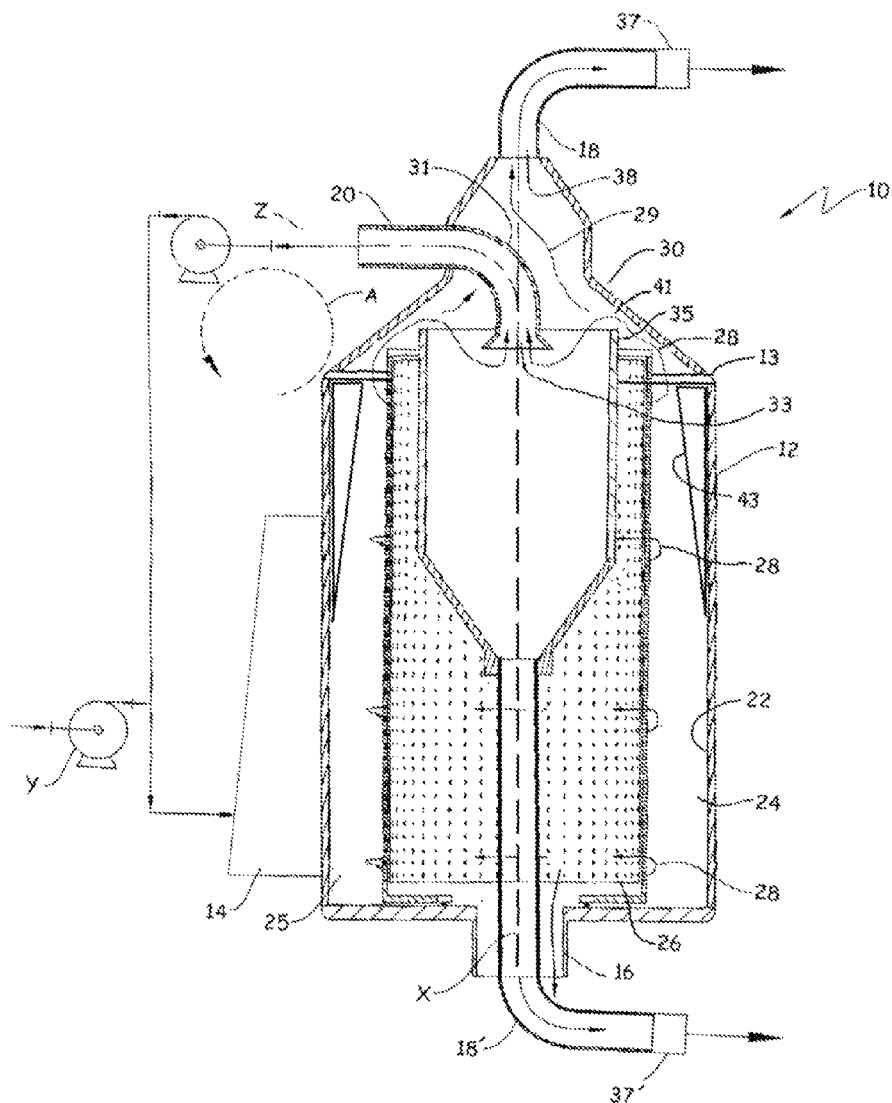
Figure 5A:
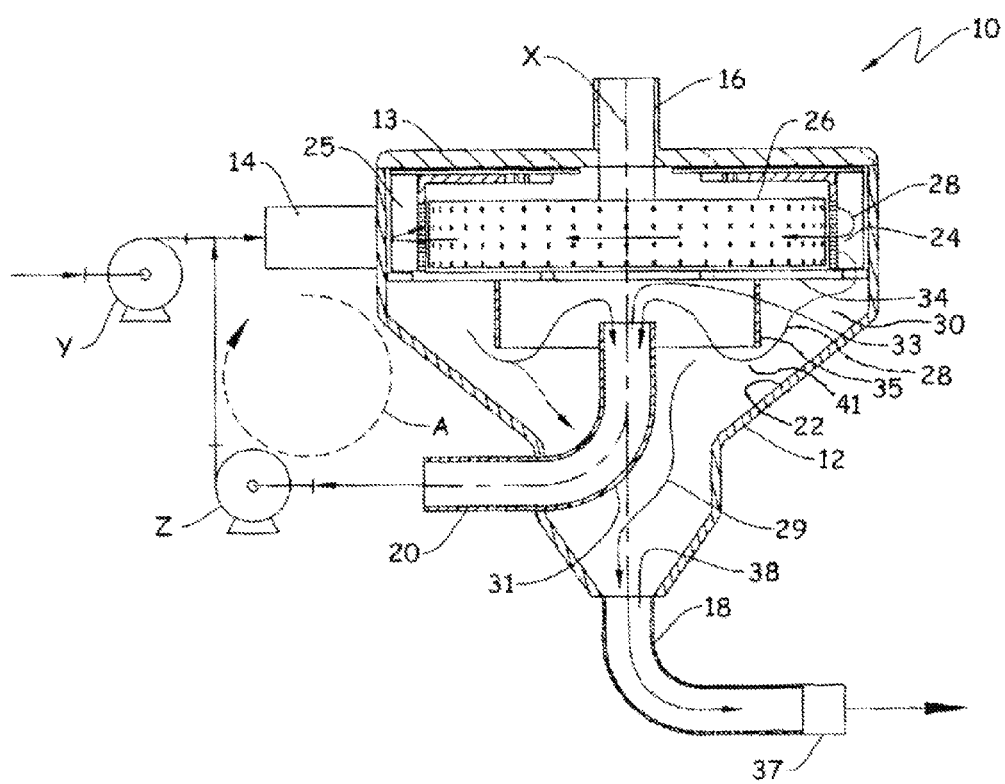
FIGS. 5A and B are cross-sectional views showing yet additional embodiment of the invention FIGS. 6A and B are perspective views of embodiments of vortex flow barriers.

As illustrated in FIGS. 4A, 4B and 5A, the system (10) may also include an optional conduit (31) including a process fluid inlet (33) located near the axis (X) (e.g. centrally located) within the particulate settling chamber (30) which is in fluid communication with the process fluid outlet (20). The process fluid inlet (33) may include a region wider than the conduit (31) at its inlet to facilitate particle collection and this wider region may be sloped. The hydroclone (10) may further include an optional baffle (35) located about (e.g. concentrically) the inlet (33). The baffle (35) limits the amount of solids entering the inlet (33) by blocking a direct pathway. By blocking a direct or near linear fluid pathway from the vortex chamber (24), solids tend to settle out of the more dynamic fluid flow entering the inlet (33). In the embodiment of FIG. 4A, the axis (X) is vertically aligned and the fluid inlet (33) faces vertically upward near the center of the particulate settling chamber (30). In this configuration, the fluid treatment pathway (28) follows a serpentine path from the cross-flow filtration chamber (24) to the fluid outlet (20). Importantly, the path reverses course, initially flowing generally downward and then upward, and finally downward within the conduit (31). Particles within the bulk flowing along this pathway tend to be drawn downward to the effluent outlet (18) and are unable to reverse flow direction due to gravitational forces. FIG. 4B illustrates an alternative arrangement wherein the inlet (33) faces downward and a baffle is located concentric about the inlet (33) extending upward. The use of an optional baffle (35) enhances the separation. While the baffle (35) is shown as having a cylindrical or conical structure, other structures which block a direct pathway may also be used.

Both FIGS. 4A and 4B illustrate that more than one effluent opening (38, 38') and corresponding effluent outlets (18, 18') may be present for collection and concentration of substantially different particulate matter. In these figures, the openings (38, 38') are oppositely oriented. The position and orientation of openings (38, 38') within the particulate settling chamber (30) may be selected to separate solids differing in average density (e.g. by at least 0.05 g/cc or even 0.1 g/cc) or particulates differing in average size (by at least 50% in diameter). Material from either or both of different effluent outlets (18, 18') may be subject to additional differing post-treatment steps.

In FIG. 4B the settling zone (30) is located above the cross flow filtration zone (24) within a common tank (12). In this embodiment, the lower effluent opening (38) protrudes within the filtrate chamber (46) and both the effluent opening and filtrate chamber are surrounded by the cylindrical membrane surface (44).

In FIGS. 4A and 4B, the length of the membrane cylinder exceeds it diameter and twice its diameter, respectively. This aspect ratio has implications for both cross flow and the vortex, as it is difficult to maintain the same rotational flow over a longer cylinder length. To support operation with high cross flow in this geometry, several options may be used. The fluid inlet (14) may be configured to provide feed liquid down the length of the membrane cylinder at a variable rate. More brushes may be present on the downstream section of a rotating cleaning assembly (50), to help maintain rotational flow. Brushes may be angled to increase cross flow velocity parallel to the axis (X). The inner periphery of the filtration chamber (24) may be angled or incorporate volume-filling inserts (43), as illustrated in FIG. 4B, to increase velocity with reduced fluid flow in the downstream section. Due to pressure drop along the fluid treatment pathway (28), the long aspect ratio of the membrane cylinder also has negative implications for flux. To counter unevenness in filtrate flux between the upstream and downstream sections of the membrane surface (44), the filtrate chamber may be divided into isolated sections having separate filtered fluid outlets (16) or having flow resistances therebetween, wherein the pressure of an upstream filtrate section exceeds that of a downstream filtrate section by at least 1 psi and/or the flow resistance between an upstream filtrate section and a downstream filtrate section exceeds at least 50% of the flow resistance across the membrane (e.g. from the fluid pathway 28 to filtrate chamber (46)). Also to reduce flux differences between upstream and downstream membrane sections of the cylinder, the properties of the membrane surface may be different in these regions, preferably using a membrane surface (44) with smaller pores on the upstream section.

Figure 6A:
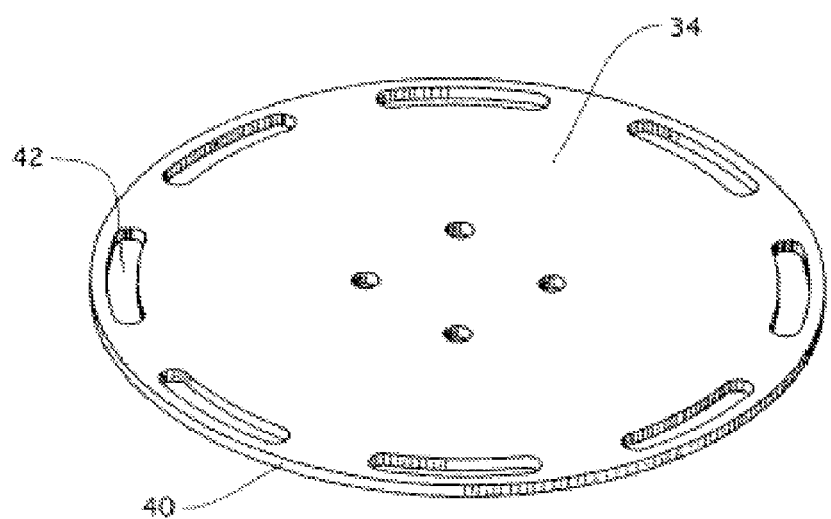
Figure 6B:
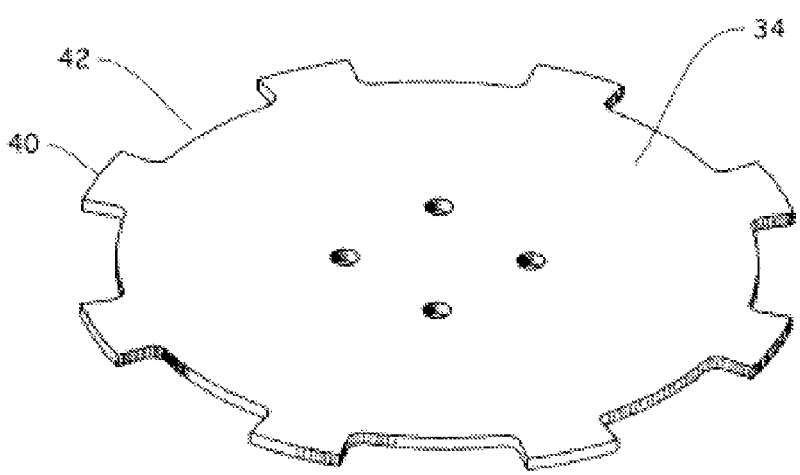

FIG. 5A illustrates an embodiment similar to that shown in FIG. 2 but additionally includes a vortex flow barrier (34) located between the cross-flow filtration and particulate settling zones (24, 30). The barrier (34) effectively creates "chambers" out of the zones (24, 30). The flow barrier (34) limits fluid flow between the chambers (24, 30) by directing a majority of fluid flow between the cross-flow filtration chamber (24) and particulate settling chamber (30) to locations adjacent to the inner peripheral wall (22) of the tank (12). The vortex flow barrier (34) is preferably designed to maintain vortex fluid flow in the cross-flow filtration chamber (24) while allowing a reduced fluid velocity within the particulate settling chamber (30). Preferably, the vortex flow barrier (34) at least partially disrupts vortex fluid flow (28) as fluid flows from the cross-flow filtration chamber (24) into the particulate settling chamber (30). In a preferred embodiment, the vortex flow barrier (34) includes an outer periphery (40) extending to locations adjacent to (e.g. within 50 mm, 25 mm or even 10 mm) or in contact with the inner peripheral wall (22) of the tank (12) and may optionally include a plurality of apertures (42) located near the periphery (40) and extending therethrough. The size and shape of apertures (42) is not particularly limited, e.g. scalloped-shaped, slots, elliptical, etc. A few representative examples are illustrated in FIGS. 6A-B. In yet other non-illustrated embodiment, the vortex flow barrier (34) may include an outer periphery that includes no apertures and extends to locations adjacent to (e.g. within 50 mm, 25 mm or even 10 mm) the inner peripheral wall (22) of the tank (12). The vortex flow barrier (34) is designed to control the flow of fluid through the chambers of the tank (12) with a majority (e.g. preferably at least 50%, 75%, and in some embodiments at least 90%) of volumetric flow being preferentially directed to locations near (e.g. within at least 50 mm, 25 mm or even 10 mm) the inner peripheral wall (22) of the tank (12). With that said, a minority (e.g. less than 50% and more preferably less than 75% and still more preferably less than 90%) of the fluid flow may occur at alternative locations including the center location. While the illustrated embodiments have a plate or disc configuration, the vortex flow barrier may assume other configurations including one having an angled or curved surface, e.g. cone- or bowl-shaped.

Figure 5B:
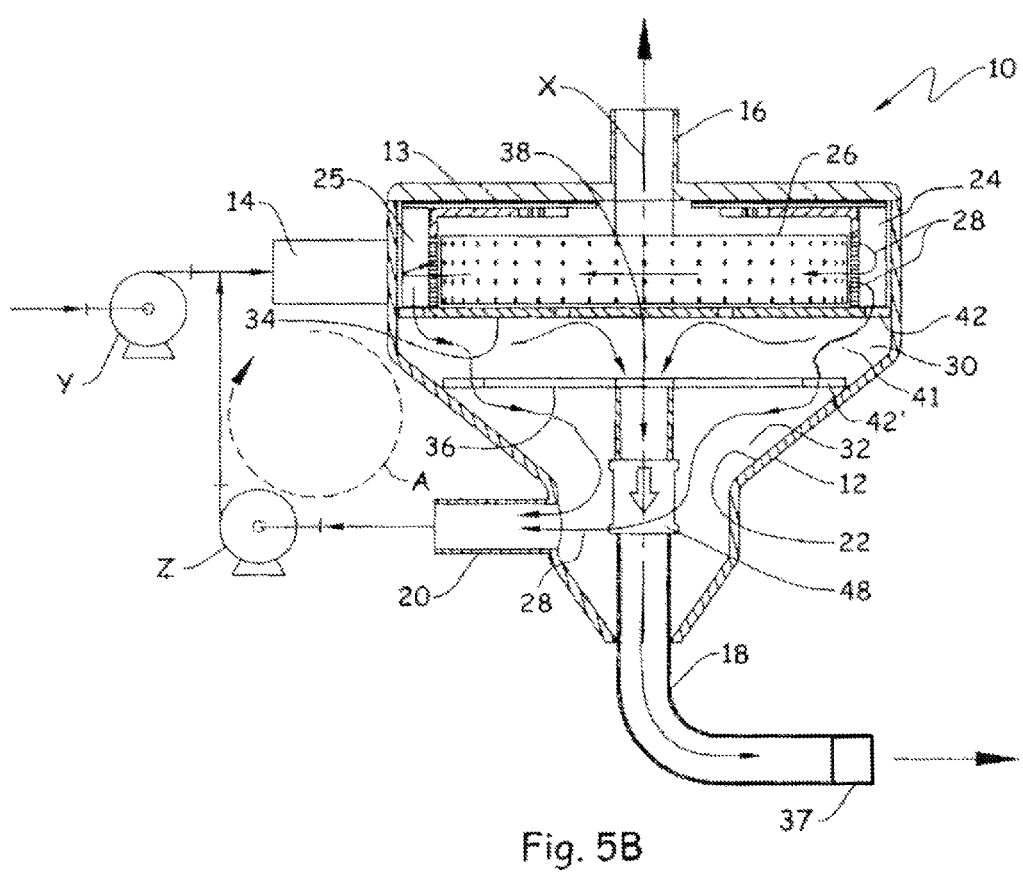

FIG. 5B illustrates an embodiment similar to that shown in FIG. 5A but additionally includes an effluent barrier (36) (best shown in FIG. 7) located below the particulate settling chamber (30) that is adapted to direct fluid flow from the particulate settling chamber (30) to the process fluid outlet (20). The effluent barrier (36) includes an outer periphery (40') extending to locations adjacent to or in contact with the inner peripheral wall (22) of the tank (12) and may further include a plurality of apertures (42') located near the periphery (40') and extending therethrough. In a preferred embodiment, the apertures (42) of the vortex flow barrier (34) are vertically off-set from the apertures (42') of the effluent barrier (36). The effluent barrier (36) also includes a centrally located effluent opening (38) in fluid communication with the effluent outlet (18) by which effluent may exit the tank (12).

Figure 8:
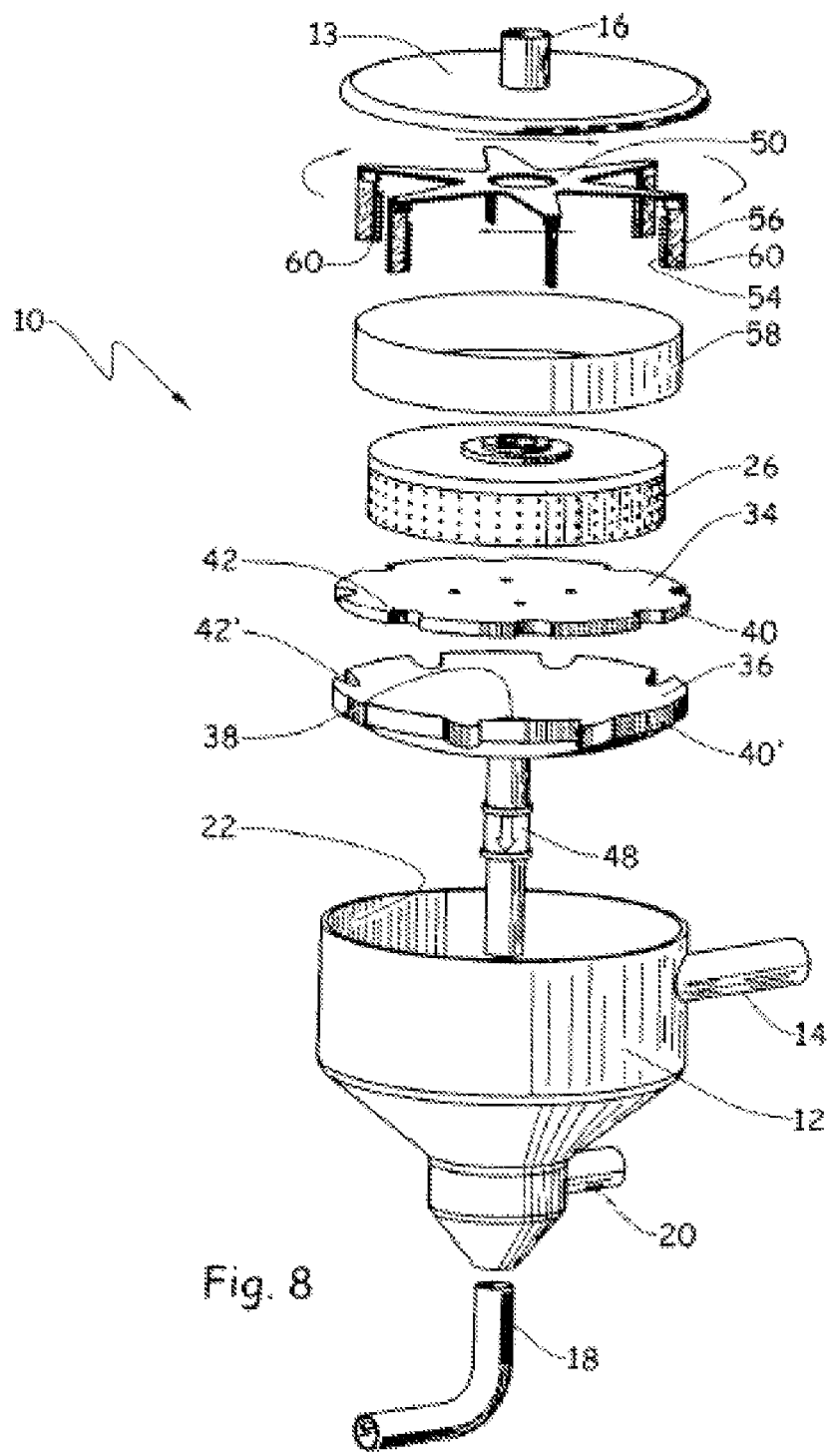
FIG. 8 is an exploded perspective view of an alternative embodiment of a tank including a vortex and effluent barrier.

While in one embodiment the effluent barrier (36) includes scalloped-shaped apertures (42'), (see FIG. 8), alternatively shaped apertures including radial slots, angled slots and triangular openings located about the outer periphery (40') (see FIG. 7). Similarly, alternatively shaped apertures (42) may be used with respect to the vortex flow barrier (34). The shape and size of the aperture (42,42') may be designed to control the flow of fluid downward through the chambers (24, 30, 32) of the tank (12), with flow being preferentially directed to the inner peripheral wall (22) of the tank (12). With that said, a minority (e.g. less than 50% and more preferably less than 75% and still more preferably less than 90%) of the downward flow (i.e. non-effluent fluid with respect to the effluent barrier (36)) may occur at alternative locations including the center location of one or both barriers (42, 36). In yet other non-illustrated embodiment, one or both of the vortex flow barrier (34) and effluent barrier (36) may include outer peripheries that do not contact the inner peripheral wall (22) of the tank (12) and include no apertures. Experiments and simulations have shown that offsetting apertures (42) between the vortex flow barrier (34) and effluent barrier (36) can create regions (41) that transition to an average positive upward component of velocity for fluids in the bulk, and this offsetting of apertures increases separation efficiency.

The embodiments illustrated in FIGS. 4 and 5 each include a filter assembly (26) centrally located within the cross-flow filtration chamber (24) and enclosing a filtrate chamber (46). The filtrate chamber (46) is in fluid communication with the filtered fluid outlet (16). The particulate settling chamber (30) is located below (except in FIG. 4B) and is in fluid communication with the cross-flow filtration chamber (24). The particulate settling chamber (30) is adapted for receiving unfiltered fluid from the cross-flow filtration chamber (24). In the embodiment of FIG. 5B, a process fluid chamber (32) is in turn located below and is in fluid communication with the particulate settling chamber (30). The process fluid chamber (32) is adapted for receiving a process fluid from the particulate settling chamber (30) and is in fluid communication with the process fluid outlet (20) by which process fluid may exit the tank (12).

In operation, pressurized feed fluid (e.g. preferably from 4 to 120 psi) enters the tank (12) via the fluid inlet (14) and follows along the fluid treatment pathway (28) which generates a vortex about the filter assembly (26). Centrifugal forces urge denser materials toward the inner peripheral wall (22) of the tank (12) while less dense liquid flows radially inward toward the filter assembly (26). A portion of this liquid flows through the filter assembly (26) into a filtrate chamber (46) and may subsequently exit the tank (12) as "filtrate" by way of the filtered fluid outlet (16). The remaining "non-filtrate" flows downward from the cross-flow filtration chamber (24) to the particulate settling chamber (30).

In some embodiments, a vortex flow barrier (34) is present and directs the majority (e.g. preferably at least 75% and in some embodiments at least 90%) of such downward flow to locations along or adjacent to an inner peripheral wall (22) of the tank (12). This arrangement is believed to help maintain vortex flow within the cross-flow filtration chamber (24) while disrupting the vortex flow as fluid enters the particulate settling chamber (30). Fluid flow slows in the particulate settling chamber (30) and denser materials (e.g. particles) preferentially settle toward the center of the effluent barrier (34) and enter into the effluent opening (38) and may then exit the tank by way of the effluent outlet (18). In the embodiment of FIG. 5B, the remaining liquid (hereinafter referred to as "process fluid") in the particulate settling chamber (30) flows downward into the process fluid chamber (32). The effluent barrier (36) directs a majority (e.g. preferably at least 75% and in some embodiments at least 90%) of fluid flow between the particulate settling and process fluid chambers (30, 32) to locations along or adjacent to an inner peripheral wall (22) of the tank (12), i.e. through apertures (42').

In a preferred embodiment, the fluid treatment pathway (28) in the particulate settling chamber (30) includes a region (41) passed through by most particles, where bulk fluid initially moving towards the effluent outlet (18) is caused to decelerate and move away from the effluent outlet (18). For instance, transition to an upward component of bulk flow can promote separation and settling of particles under gravity. In FIGS. 4A, 4B, and 5A, upward or downward acceleration may be created at such regions (41).

The system (10) may also include a valve (37) for selectively removing effluent from the particulate settling chamber (30). Preferably, a valve (37) is suitable to alternate between a closed position that restricts flow from the effluent outlet (18) and creates a quiescent region within the particulate settling chamber (30) and an open position that purges effluent from the quiescent region through the effluent outlet (18). The quiescent region is preferably located adjacent to the effluent outlet (18) and has an average flow velocity less than 1% of the bulk flow velocity at the process fluid inlet (33) of the particle settling chamber (30). Preferably, the quiescent region encompasses a cubic region of at least $2 \times 2 \times 2$ cm$^3$, to limit particles leaving. It is also preferably that the quiescent region encompasses at least 25% of the particulate settling zone volume.

The valve (37) is preferably automated to open based on a measurement (e.g. measured concentrations in the particulate settling zone (30) or recirculation loop (A)), or based upon a periodical timing. The valve (37) is preferably in the closed position most of the time, and this may be more than 90% or 95% or even 99% of the time. Time intervals during which the valve is closed preferably exceed 1 min, 5 min, or even 15 min. Longer times between openings allow for higher accumulation of solids within the quiescent zone. The solids level discharged from the particulate settling zone through the effluent outlet may exceed 10%, 25%, or even 50% by weight. This may be at least 100 times the concentration of the liquid supplied by the feed pump (Y).

The valve (37) preferably opens after time intervals shorter than the average residence time for a 200 micron sphere (density 1.09 g/cc) in the quiescent zone. The system is preferably operated such that the average residence time for a 200 micron spherical particle (density 1.09 g/cc) in the quiescent region adjacent the effluent outlet (18) exceeds 1 minute, or even 5 minutes, when the valve is closed. Preferably, a 200 micron sphere has at least two times, or even five times, the probability of being capture in the quiescent zone for more than 5 minutes during a pass through the settling chamber (30), as compared to similar sphere (1.09 g/cc) having diameter equal to the average membrane pore size. For purposes of these measurements, spherical particles having a wide range of sizes and densities may be available from Cosphereic (Santa Barbara, Calif.).

Use of a cleaning assembly (50) that continuously engages with the membrane surface (44) is particularly advantaged in combination when the filter assembly (26) and particulate settling chamber (30) are in series within a recirculation loop. Experiments have demonstrated that removal of particles in the particulate settling zone (30) was strongly dependent on particle size. Removal efficiency can low be for particles of 50 microns. During filtration, particles may be agglomerated and/or compacted and then removed by the cleaning assembly, increasing their removal rate in the particulate settling chamber (30). By providing a rotating cleaning assembly (50) that continuously dislodges particles, the size of particles may be sufficiently increased while still maintaining a high flux rate. This is particularly important for high recovery operations, such as those involving liquid mixtures with solids greater than 0.2, 0.5, or 1% by mass.

Due to the continuous cleaning, high recirculation, removal and concentration of particles by the particulate settling zone, and relatively low recoveries in both the filtration and particulate settling zones, the system can operate well with high solids. In operation, the system is preferably operated with an average volumetric recovery of at least 85%, 90%, 95%, or even 99% (i.e. the fraction of liquid that leaves the system through the membrane as filtrate).

When a system includes both a filtration zone and a particulate settling zone in series, the use of both a feed pump (Y) and recirculation pump (Z) is also advantaged. As each pass through the settling chamber has relatively low recovery of particles, several passes through the two zones are needed on average to remove each particle. Within the filtration zone, an applied pressure at the filtration zone inlet must exceed the transmembrane pressure, and uniform flux along the fluid treatment path is more readily attained when systems are designed for a higher transmembrane pressure. Since pressure drops associated with each operating zone and pass are cumulative, a system designed around a single pump can have substantial efficiency losses through re-pressurization of each pass. By contrast, if a feed pump (Y) is used to provide a pressurized liquid to a pressurized recirculation loop driven by a second pump (Z), the energy losses on successive passes associated with re-pressurizing to a transmembrane pressure and any filtrate back-pressure are avoided. The recirculation pump needs only to supply energy to drive fluid through the recirculation loop, and, in some embodiments, create relative motion between the membrane surface (44) and cleaning assembly (50). Using separate pumps to provide pressure and volume requirements is particularly advantaged when the recirculation pump (Z) drives a volume of liquid through the recirculation loop that is at least twice, more preferably at three times, the volume of feed liquid introduced by the feed pump (Y) to the recirculation loop. Because of the further synergies provided by multiple passes through the continuous cleaning assembly and a particulate settling zone, the dual pump arrangement is additionally advantaged.

In another embodiment, the system may include a plurality of particulate settling zones (30) and/or filtration zones (24) ganged together in parallel to a common recirculation pump (Z). The recirculation pump (Z) may simultaneously drive flow through two or more parallel filter assemblies (26) within the recirculation loop. Similarly, the recirculation pump may drive flow through two or more settling chambers (30) within the recirculation loop (A). Preferably, the recirculation pump (Z) drives flow through parallel tanks (12) comprising both a filter assembly (26) and a settling chamber (30). The pressurized recirculation loop (A) may be fed by a common feed pump (Y).

The invention is particularly advantaged because particles may be removed through a plurality of passes through the system. The filtration zone is preferably operated with recoveries less than 50%, 25%, or even 10%, allowing both a high cross flow velocity and high cleaning rates. (Although cleaning is continuously performed, short times exist between discrete engagements of the rotatable cleaning assembly with any given location on the membrane.) Particles within a given pass through the settling chamber also have a relatively low probability of removal. For example, the probability that a 200 micron plastic sphere (density 1.09) may be removed in a given pass may be less than 30%, or even less than 10%.

As previously described, pressure losses from successive passes are minimized by use of the recirculation pump. The is particularly important, because the pressure drop across the membrane (from fluid treatment pathway to the filtrate region) can then be a small fraction of the pressure provided by the feed pump, less than 50%, 25%, or even 10%. In a preferred embodiment, at least 50%, more preferably 80%, of the pressure provided by the feed pump is used to drive a downstream operation (e.g. microfiltration, ultrafiltration, nanofiltration, or reverse osmosis). The pressure drop between locations on the fluid treatment pathway (28) at opposite ends cross-flow filtration zone (24) is also preferably small, e.g. less than 20%, 10%, or 1% of pressure supplied by the feed pump (Y).

The subject separations systems provide superior separation efficiencies as compared with previous designs. These efficiencies allow the systems to be used in a broader range of applications; particularly in embodiments where process fluid is recycled and optionally blended with make-up feed fluid. In certain preferred embodiments, feed fluid is subjected to a synergistic combination of multiple separation processes within a single device. Specifically, feed fluid is subject to cyclonic separation based at least partially upon density with denser material (e.g. particles, liquids) being urged toward the inner periphery of the tank. Fluid passing through the filter assembly is additionally subjected to cross-flow filtration. The subject inlet feed shield prevents the membrane used in cross-flow filtration from being subject to excessive wear or fouling attributed to the feed pressures and feed content associated with cyclonic separations. The entire subject matter of each of the US patents mentioned herein references are fully incorporated by reference.

The invention claimed is:

1. A cross-flow filtration system (10) comprising:
a tank (12) including an inner peripheral wall (22) surrounding a cross-flow filtration zone (24) and particulate settling zone (30) sequentially aligned along an axis (X), wherein the cross-flow filtration zone (24) is in fluid communication with a the particulate settling zone (30);
a fluid inlet (14) in fluid communication with one of said zones and a process fluid outlet (20) and in fluid communication with the other zone;
a fluid treatment pathway (28) extending from the fluid inlet (14), through the cross-flow filtration and particulate settling zones (24, 30) and to the process fluid outlet (20);
a filter assembly (26) located within the cross-flow filtration zone (24) and comprising a membrane surface (44) that isolates a filtrate chamber (46) from the fluid treatment pathway (28), wherein the filtrate chamber (46) is in fluid communication with a filtered fluid outlet (16);
a cleaning assembly (50) concentrically located about and rotatably engaged with the membrane surface (44);
a recirculation pump (Z) in fluid communication with the process fluid outlet (20) and fluid inlet (14);
a pressurizable recirculation loop (A) comprising the fluid treatment pathway (28) and the recirculation pump (Z), wherein the recirculation pump (Z) is adapted for driving pressurized fluid from the process fluid outlet (20) through the recirculation loop (A);
a feed pump (Y) adapted to introduce feed liquid into the system (10); and
an effluent outlet (18) in fluid communication with the particulate settling zone (30);
wherein the feed pump (Y), effluent outlet (18) and filtered fluid outlet (16) reside outside of the recirculation loop (A).

2. The system (10) of claim 1 wherein the recirculation pump (Z) is adapted to drive at least twice the volume of liquid through the recirculation loop (A) as introduced by the feed pump (Y) and wherein the feed pump (Y) is adapted to provide a greater pressure increase than provided by the recirculation pump (Z).

3. The system (10) of claim 1 further comprising a valve (37) movable between a closed position that restricts flow of effluent from the particulate settling zone (30) and an open position that permits effluent to exit the system (10) by way of the effluent outlet (18) particulate settling zone (30).

4. The system (10) of claim 1 wherein cross-flow filtration zone (24) and particulate settling zone (30) are serially arranged along the fluid treatment pathway (28) with the particulate settling zone (30) being located downstream from the cross-flow filtration zone (24).

5. The system (10) of claim 4 wherein:
the membrane surface (44) is symmetrically located about the axis (X); and
the fluid treatment pathway (28) extends from the fluid inlet (14) and between the inner peripheral wall (22) of the cross-flow filtration zone (24) and the membrane surface (44) and further extends into the particulate settling zone (30) to exit the tank (12) through the process fluid outlet (20); and
an effluent pathway (29) extends from the particulate settling zone (30) and exits the tank (12) through the effluent outlet (18).

6. The system (10) of claim 5 wherein the fluid treatment pathway (28) includes a vortex region (25) located between the inner peripheral wall (22) of the tank (12) and the membrane surface (44) that is adapted for receiving incoming liquid and generating a vortex fluid flow about the filter assembly (26).

7. The system (10) of claim 6 further comprising a flow barrier (34) located between the cross-flow filtration and particulate settling zones (24, 30) and defining a respective cross-flow filtration chamber (24) and particulate settling chamber (30).

8. The system (10) of claim 7 wherein the flow barrier (34) directs a majority of fluid flow between the cross-flow filtration chamber (24) and particulate settling chamber (30) to locations adjacent to the inner peripheral wall (22) of the tank (12).

9. The system (10) of claim 7 wherein the flow barrier (34) disrupts vortex fluid flow from the cross-flow filtration chamber (24) and the particulate settling chamber (30).

10. The system (10) of claim 5 further comprising comprises a conduit (31) including a process fluid inlet (33) located near the axis (X) of the particulate settling chamber (30) that is fluid communication with the process fluid outlet (18).

* * * * *